L. MURPHY.
APPARATUS FOR INDICATING THE DEPTH OF LIQUIDS IN VESSELS.
APPLICATION FILED MAY 15, 1918.

1,294,939.

Patented Feb. 18, 1919.

Witnesses:

Inventor
Leonard Murphy
by
Attorney

UNITED STATES PATENT OFFICE.

LEONARD MURPHY, OF DUBLIN, IRELAND.

APPARATUS FOR INDICATING THE DEPTH OF LIQUIDS IN VESSELS.

1,294,939.  Specification of Letters Patent.  Patented Feb. 18, 1919.

Application filed May 15, 1918. Serial No. 234,703.

*To all whom it may concern:*

Be it known that I, LEONARD MURPHY, a subject of the King of Great Britain, residing in Dublin, Ireland, have invented certain new and useful Improvements in Apparatus for Indicating the Depth of Liquids in Vessels, of which the following is a specification.

In Letters Patent No. 867994 of 1907 I have described an apparatus for indicating the depth of liquid in a vessel by forcing air or other gas into a gage or gage reservoir until the effective pressure on the indicating liquid was that due to the depth of liquid in the vessel to be gaged, the gas being introduced into the gage through a tube dipping into the indicating liquid which automatically sealed the apparatus against leakage of the gas, any excess gas escaping through the open end of the line tube which reached to the bottom of the vessel to be gaged.

The apparatus required a separate air compressor or collapsible bulb and if this were defective it might fail to sufficiently compress the air. If the tube through which the air pressure was conveyed to the gage was of large bore the accuracy of the indications was affected by the volume of liquid required to seal the tube. If, on the other hand, the tube was of fine bore it was liable to choke.

These drawbacks are removed according to the present invention, in which the gage glass acts also as the air compressor, thus doing away with the separate compressor and the tube by which the air pressure was transmitted to the gage. Also, as no air is forced through the liquid in the indicating apparatus, a more permanent zero is obtained.

In the accompanying drawings, which show examples of apparatus according to the invention, Figure 1 is a vertical sectional view of an apparatus embodying the invention;

Figure 1:
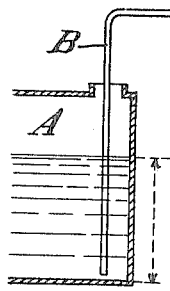
Figure 2:
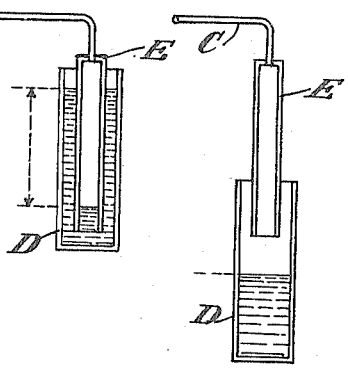
Fig. 2 is a vertical sectional view of the gage glass shown in Fig. 1, and the parts associated therewith, said parts being shown in a different position from that shown in Fig. 1.

Referring to Figs. 1 and 2, A is the vessel of which the depth H of the liquid contained therein is required. A tube B open at the lower end is immersed to the bottom of the vessel and communicates by the branch C with the closed top of a tube E which is open below and is placed within a transparent gage glass D. The gage D is closed at the lower end and is filled to a zero mark with an indicating liquid; the tubes D and E can be relatively raised and lowered.

In order to obtain the depth H of the liquid in the vessel A, the tubes D and E are separated preferably by lowering the tube D until the liquid in the gage glass is clear of the open end of the tube E; the glass D is then raised, compressing the air contained in the tubes E, C and B until some air escapes from the lower end of the tube B; the air pressure then remains constant and is indicated by the rise of the liquid in the outer tube D, the difference between the heights of the liquid in the tubes D and E corresponding to the depth H.

Figure 3:
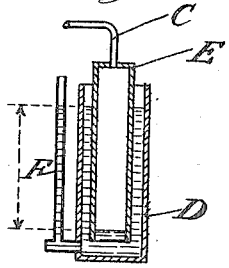
Fig. 3 is a vertical sectional view of a gage glass similar to that shown in Fig. 1 but provided with a separate gage tube.

In the example shown in Fig. 3 an indicating gage glass F is in communication with the liquid in the vessel D; in this construction the tube D may be made of an opaque material.

Figure 4:
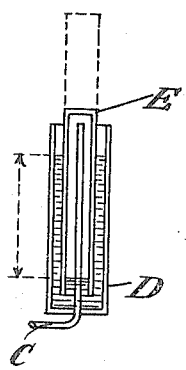
Fig. 4 is a view similar to Fig. 3 of a gage glass wherein the tube connecting the gage glass with the vessel in which the level of the liquid to be measured enters the gage glass from the bottom.
Figure 5:
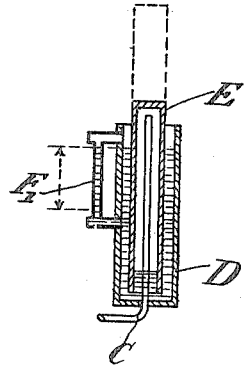
Fig. 5 is a view similar to Fig. 4 wherein the gage glass is provided with a separate gage tube.

In the examples shown in Figs. 4 and 5, the line tube C enters at the bottom of the outer tube D and the inner tube E can be raised as shown by the dotted lines.

In the example shown in Fig. 5 an indicating gage tube F' is provided as in Fig. 3. The tube F' need not extend to the lower level of the liquid in the tubes E and D and it will be sufficient to read the level of the liquid in the tube F', when suitable allowance has been made in the graduation of the tube for the fall of the liquid in the tube E corresponding to a rise in the tube D.

In the example shown in Fig. 5 all the parts may be made of opaque material except the glass F'.

A special advantage of the apparatus according to the invention is obtained by the fact that, when the outer tube D is at its lowest position relatively to the inner tube E, the liquid is at atmospheric pressure, and if any evaporation of the indicating liquid has occurred some more can be added until it stands at the zero mark.

This adjustment to the correct zero could only be effected in the instrument as described in the prior specification by unscrewing the line tube in order to release the air pressure.

Having thus described the nature of the said invention and the best means I know of carrying the same into practical effect, I claim:—

1. An apparatus for indicating the depth of liquid in a vessel, comprising a reservoir having its upper end open to the atmosphere and adapted to contain an indicating liquid to a zero mark, a tube having its upper end closed and its lower end open and adapted to be inserted and displaced longitudinally in said reservoir, a pipe having one of its ends communicating with the upper part of the interior of said tube and its other end adapted to be immersed to near the bottom of the liquid contained in a vessel, and means for indicating the difference of level of the liquid within the tube and in the reservoir surrounding the tube, when the tube is immersed in the indicating liquid contained in the reservoir to a depth sufficient to compress the air in the tube and in the communicating pipe to balance the pressure due to the depth of liquid in the vessel.

2. An apparatus for indicating the depth of liquid in a vessel, comprising a reservoir having its upper end open to the atmosphere and adapted to contain an indicating liquid to a zero mark, a tube having its upper end closed and its lower end open and adapted to be inserted and displaced longitudinally in the said reservoir, a pipe having one end communicating with the upper part of the interior of the said tube and its other end adapted to be immersed to the bottom of a liquid contained in a vessel, and a gage glass communicating with said reservoir and adapted, when said tube is immersed in the reservoir and the pressure of the air in the tube balances the pressure due to the depth of liquid in the vessel, to indicate by the level of the indicating liquid in said glass the depth of liquid in the vessel.

In testimony whereof I have signed my name to this specification in the presence of two subscribing witnesses.

LEONARD MURPHY.

Witnesses:
 NUNCIO NULLY,
 J. PLUNKETT DILLON.